(12) United States Patent
Doll et al.

(10) Patent No.: US 6,213,485 B1
(45) Date of Patent: Apr. 10, 2001

(54) LOAD DISTRIBUTION UNIT FOR HYDRAULIC VEHICLE SUSPENSION SYSTEM

(75) Inventors: Robert A. Doll, Glendale; Timothy J. Abhold, Hartland; Terence A. Bucheger, Whitewater, all of WI (US)

(73) Assignee: Applied Power Inc., Butler, WI (US)

( * ) Notice: Subject to any disclaimer, the term of this patent is extended or adjusted under 35 U.S.C. 154(b) by 0 days.

(21) Appl. No.: 09/280,134

(22) Filed: Mar. 26, 1999

Related U.S. Application Data
(60) Provisional application No. 60/079,549, filed on Mar. 27, 1998.

(51) Int. Cl.$^7$ .................................................. B60G 11/30
(52) U.S. Cl. ...................... 280/124.16; 92/128; 280/5.5; 280/6.157
(58) Field of Search .................................. 280/6.157, 5.5, 280/124.157, 124.16, FOR 159, FOR 166; 92/128, 165 R

(56) References Cited

U.S. PATENT DOCUMENTS

| | | | |
|---|---|---|---|
| 5,447,332 | 9/1995 | Heyring | 280/772 |
| 5,562,305 | 10/1996 | Heyring | 280/772 |
| 5,601,306 | 2/1997 | Heyring | 280/702 |
| 5,601,307 | 2/1997 | Heyring et al. | 280/707 |

OTHER PUBLICATIONS

"Position Sensing," brochure, 6 pgs. (Apr. 1999), Milwaukee Cylinder, 5877 S. Pennsylvania Avenue, Cudahy, WI 53110.

"Design Engineer's Cylinder Guide," brochure, 19 pgs. (Mar. 1999), Milwaukee Cylinder, 5877 S. Pennsylvania Avenue, Cudahy, WI 53110.

*Primary Examiner*—Eric Culbreth
(74) *Attorney, Agent, or Firm*—Quarles & Brady LLP

(57) ABSTRACT

A load distribution unit for a hydraulic vehicle suspension system has a pair of cylinders with each cylinder defined by a block which is common to the cylinders and four cylinder sleeves, two sleeves for each cylinder extending from opposite sides of the block. The sleeves are fixed to the block by an end cap for each sleeve, with fasteners extending from the end cap to the block to compress the associated sleeve between the end cap and the block and estalish a seal between the block and the sleeve and the end cap and the sleeve. The LDU is mounted to the vehicle with a three point mounting, and with the cylinder sleeve cantilevered from the block. A clam shell compartment is mounted and sealed to one of the end caps of each cylinder, which is covered so that its interior is accessible without breaking the seal of the clam shell compartment with the end cap.

8 Claims, 14 Drawing Sheets

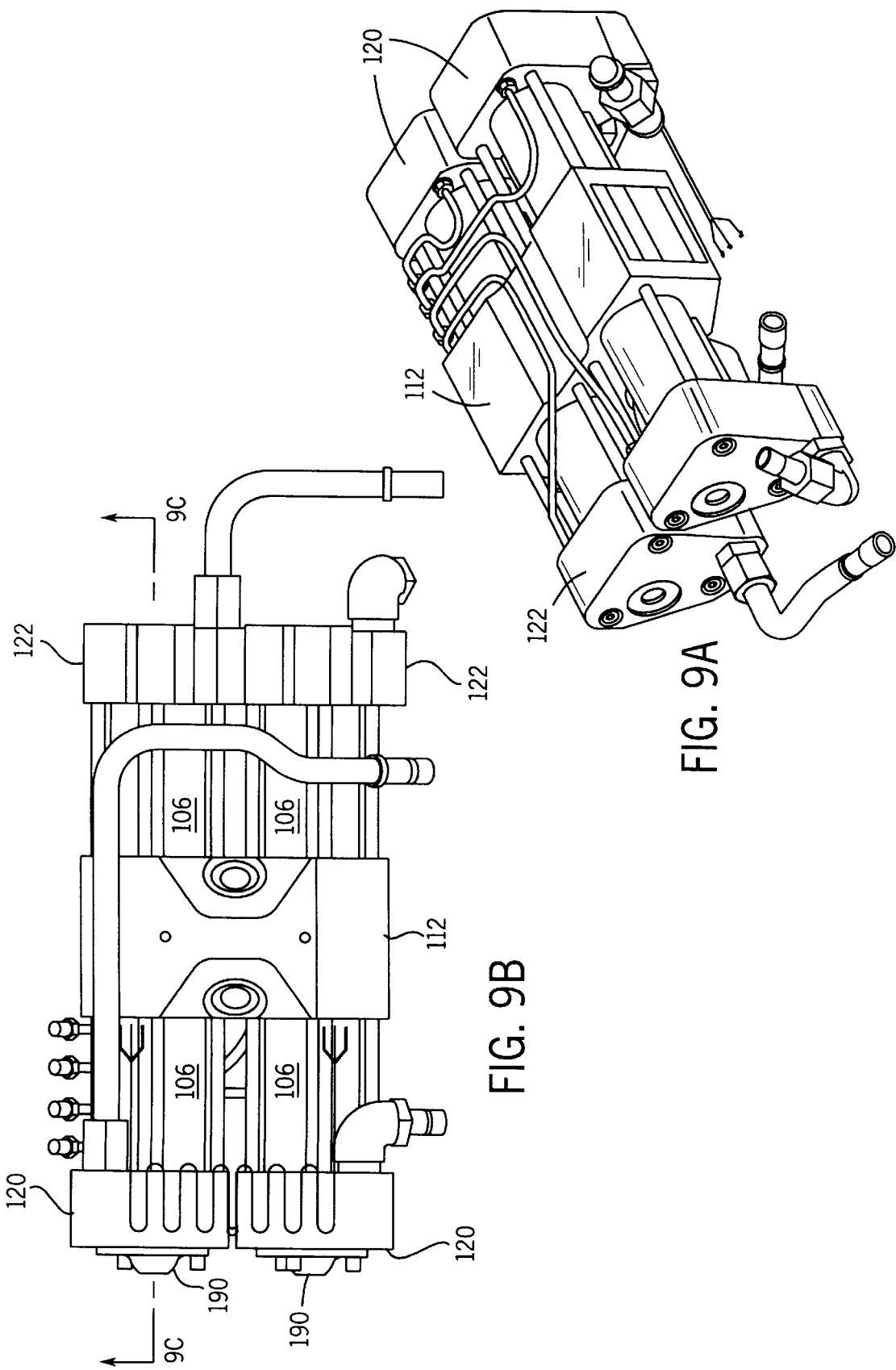

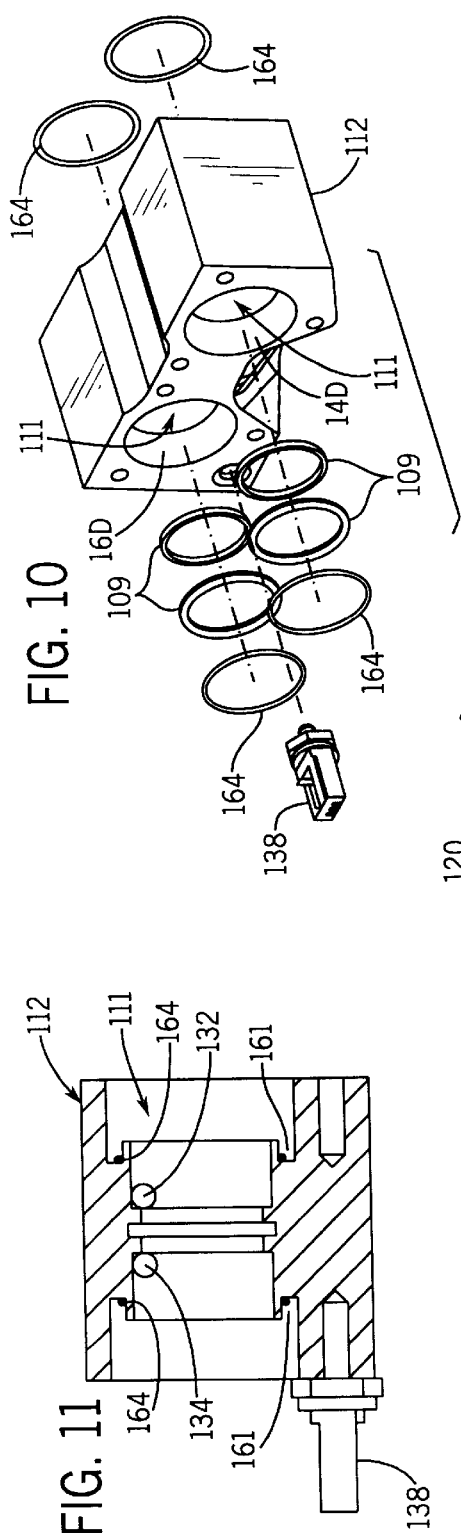
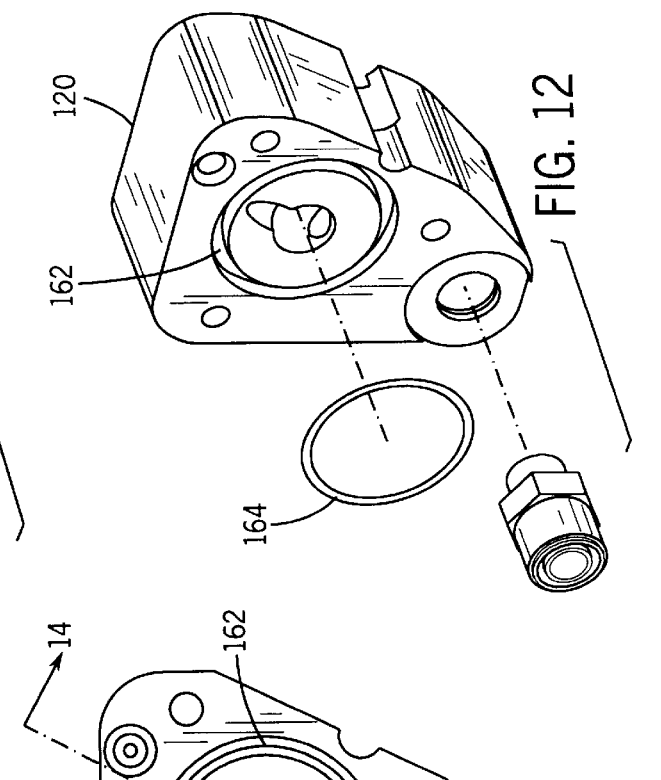
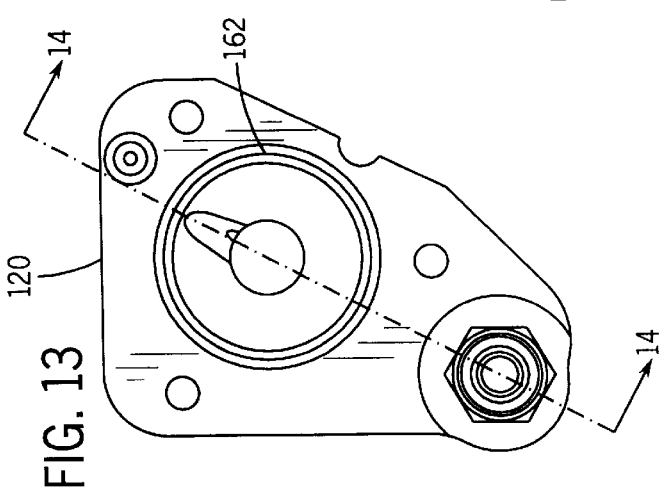
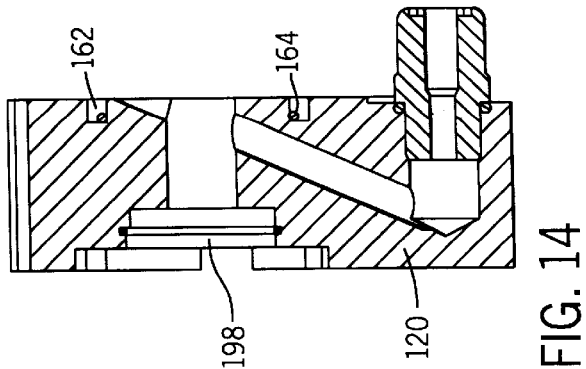

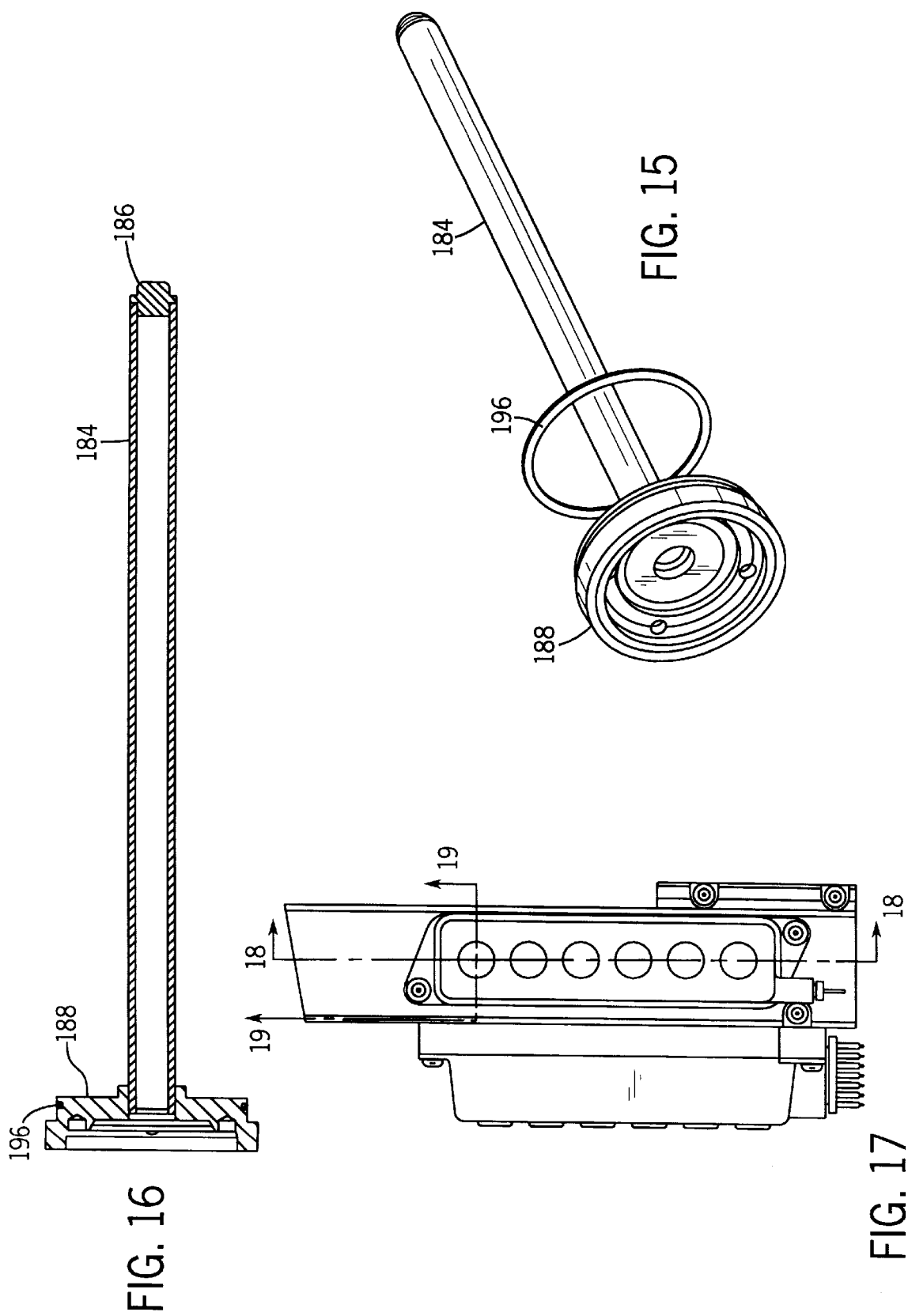

LOAD DISTRIBUTION UNIT FOR HYDRAULIC VEHICLE SUSPENSION SYSTEM

CROSS-REFERENCE TO RELATED APPLICATIONS

This claims the benefit of U.S. Provisional Patent Application No. 60/079,549 filed Mar. 27, 1998, the disclosure of which is hereby incorporated by reference.

STATEMENT REGARDING GOVERNMENT SPONSORED RESEARCH OR DEVELOPMENT

Not applicable.

FIELD OF THE INVENTION

This invention relates to a load distribution unit for a hydraulic vehicle suspension system.

BACKGROUND OF THE INVENTION

U.S. Pat. No. 5,601,307 discloses a vehicle suspension system in which a double-acting hydraulic ram supports the vehicle at each wheel with the ram chambers at opposite diagonal comers of the vehicle cross-connected so as to provide four discrete hydraulic wheel circuits. A load distribution unit is connected to the four hydraulic circuits for hydraulically equalizing the pressures in the circuits. FIG. 5 of U.S. Pat. No. 5,601,307 discloses a load distribution unit (LDU) 140 which includes a pair of cylinders, each containing a double-acting ram that divides the cylinder which contains it into four variable volume chambers, one chamber at each end of the ram and two chambers inward of the two end chambers, each chamber being isolated from all the others. Each of the inward chambers communicates with a different one of the wheel circuits, with each LDU cylinder being connected to the same chambers of the wheel cylinders on opposite sides of the vehicle, i.e. one of the inward chambers of one of the LDU cylinders is connected to the wheel cylinder circuit that connects the front left bore side (upper) wheel cylinder chamber with the rear right rod side (lower) wheel cylinder chamber, and the other inward chamber of the same LDU cylinder is connected to the wheel circuit that connects the front right bore side wheel cylinder chamber with the rear left rod side wheel cylinder chamber. In the same manner, the inward chambers of the other LDU cylinder are connected to the two wheel circuits that connect the front rod side wheel cylinder chambers with the rear bore side wheel cylinder chambers. A total of six solenoid-operated pressure supply valves 204 are supplied for providing hydraulic fluid under pressure to the various chambers of the LDU, and a total of six pressure relief or drain valves 215 are provided for relieving pressure from the various chambers. Six valves are needed in each valve bank because the two end chambers (sometimes referred to as "bump" chambers) of each LDU cylinder are connected to the corresponding two end (bump) chambers of the other LDU cylinder. As a result, a pressure-tank valve pair is needed for each of the four wheel cylinder circuits and a pair is needed for each of the two connected end (bump) chambers, for a total of six pressure-tank valve pairs (12 valves total). In addition, a reservoir 66 is provided for the hydraulic fluid, together with a pump 65 and gas-charged accumulators 202 for maintaining pressure in the system.

The LDU equalizes pressures between the various wheel circuits, and also provides a means of adding fluid to the various discrete circuits or taking it away, for load leveling and raising or lowering of the vehicle relative to the wheels. The LDU contains two pistons, which have sliding seals and must be very low leak and low friction. Excess leakage in the seals or valves results in having to run the pump excessively, or the vehicle losing pressure too quickly when parked, with consequent unintended changes in attitude or level of the vehicle relative to the wheels. Competing with the need to make the seals tight and therefore with good leakage characteristics is the need to provide low friction in the movement of the LDU pistons. High friction results in poor performance of the LDU, and unintended and unpredictable differences in the pressures between the circuits of the system, and sudden changes in pressures occurring when the LDU pistons break lose of static friction binding them and start moving.

In addition, the linear position of the LDU pistons is monitored by the onboard computer. A linear position transducer must be provided for this purpose for each LDU piston, which provides a challenge to fit it into the envelope provided and to contain the pressures required.

SUMMARY OF THE INVENTION

The invention provides an LDU for a hydraulic vehicle suspension system in which the friction of the pistons is minimized. In one aspect, the cylinder sleeves in which the pistons reciprocate are fixed to the block of the LDU by a connection and assembly procedure which permits self alignment and negates the effects of gravity which misalign the parts. The result is consistently low friction in the movement of the piston.

In this aspect, the ends of the cylinder sleeves are sealed against the block with an o-ring seal, and bolts extending from an end cap at the opposite end of the sleeve fix the sleeve to the block. The end cap is also sealed to the cylinder sleeve by an o-ring. Preferably, the ends of the cylinder sleeves are beveled on their inner surfaces and the block and end cap are grooved to receive the ends so that the bevel seats on the o-ring and wedges it into the inside corner of the groove. Clearances between the cylinder outside diameter and inside diameter and the center block and end cap grooves allow the cylinder to "float" radially during assembly and achieve an optimum concentric location relative to the mating components of the LDU.

This assembly is performed with the cylinder axes vertical so that the weight of the parts resting against one another does not create misalignments. It is also performed after the piston rod is inserted through the block bore and sliding seal in which the piston rod slides and a removable piston head is attached to the piston rod.

In another aspect contributing to low friction operation, the cylinder sleeves and end caps are cantilevered from the block. The block is bolted to the vehicle, for example to a skid plate which is fixed to the vehicle. It is also desirable to add a third mounting bolt, positioned away from the block so as to react against tipping of the LDU about the block, and this may be affixed to the valve manifold which is bolted to the block. Thereby, a three point mounting is created without mounting the cylinders or end caps to the vehicle, which can result in misalignments of the pistons in the LDU cylinders and consequently increased friction.

In another feature of an LDU of the invention, a linear position transducer is contained within a clam shell compartment, which extends inside the tubular piston rod, keeps the transducer dry and is accessible from outside of the LDU and without exposing the fluid in the LDU to contaminants.

These and other objects and advantages of the invention will become apparent from the detailed description and drawings.

BRIEF DESCRIPTION OF THE DRAWINGS

FIG. 9A is a perspective view of the cylinder subassembly;

FIG. 9B is a bottom plan view of the cylinder subassembly;

FIG. 10 is an exploded perspective view of a block of the cylinder subassembly;

FIG. 11 is a longitudinal section view through one of the cylinder bores of block of FIG. 10;

FIG. 12 is an exploded perspective view of an end cap for the cylinder subassembly;

FIG. 13 is a front plan view of the end cap of FIG. 12;

FIG. 14 is a sectional view from the plane of the line 14—14 of FIG. 13;

FIG. 15 is a perspective view of part of a clam shell compartment for the cylinder subassembly;

FIG. 16 is a longitudinal sectional view of the part shown in FIG. 15;

FIG. 17 is a top plan view of the valve manifold for the LDU with both valve banks assembled to it;

DETAILED DESCRIPTION OF THE PREFERRED EMBODIMENT

Figure 1:
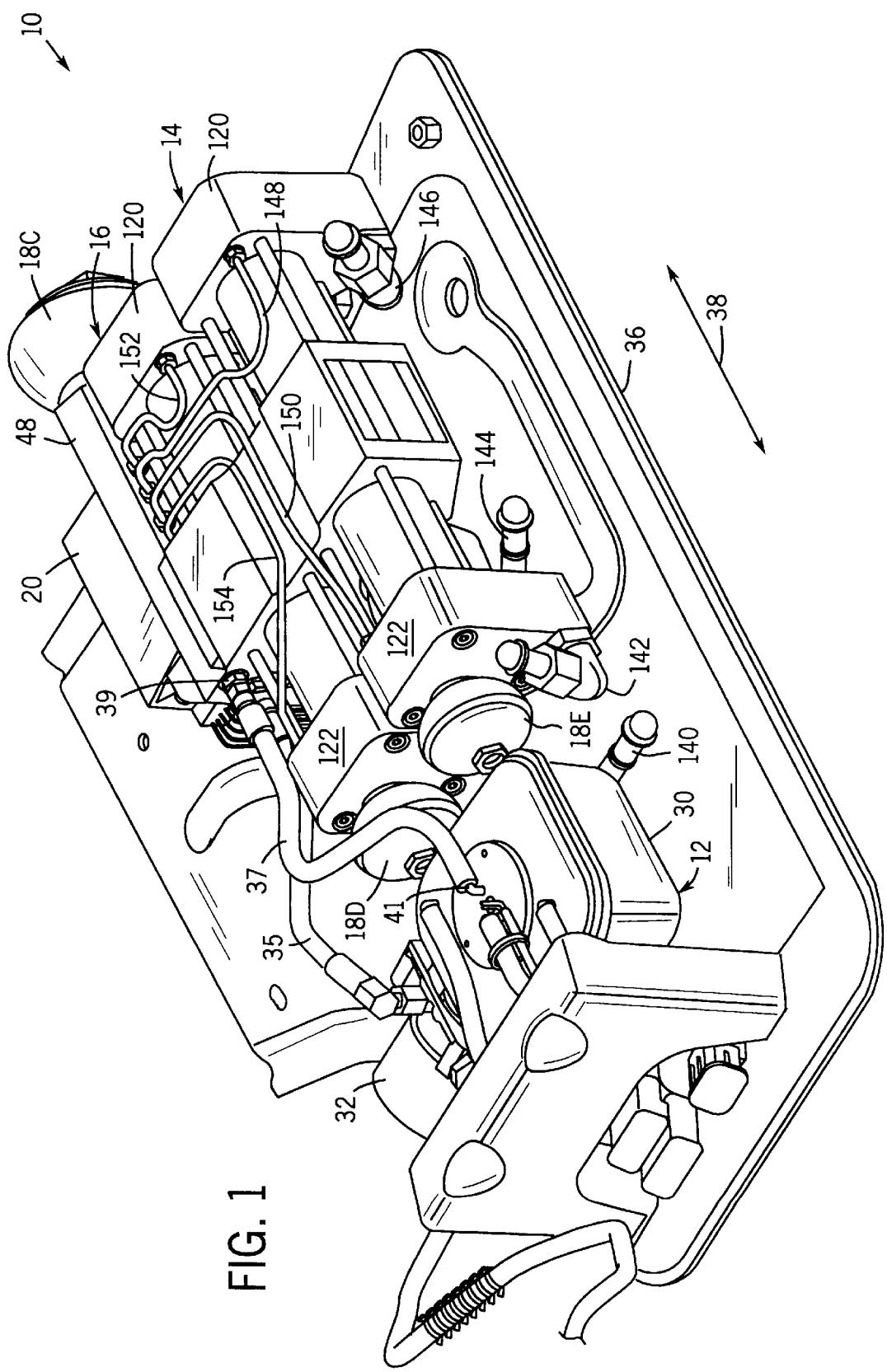
FIG. 1 is a perspective view of an LDU incorporating the invention, a power unit and a mounting plate for a hydro pneumatic vehicle suspension system.

FIG. 1 illustrates an LDU 10 and power unit 12 which may be used in a vehicle suspension system of the type described in U.S. Pat. No. 5,601,307, the disclosure of which is hereby incorporated by reference. The LDU 10 includes a pair of cylinders 14 and 16, a number of accumulators 18A–E, and supply 20 and relief 22 valve banks. The power unit 12 includes a reservoir 30 and a motor/pump unit 32. The LDU 10 and power unit 12 are mounted on a skid plate 36 which is bolted to the chassis of the vehicle, for example, to the bottom outside of the passenger compartment under the driver's seat area of the vehicle, so that the fore-aft direction of the vehicle (the direction of travel) is represented by the arrow 38 in FIG. 1.

Figure 5:
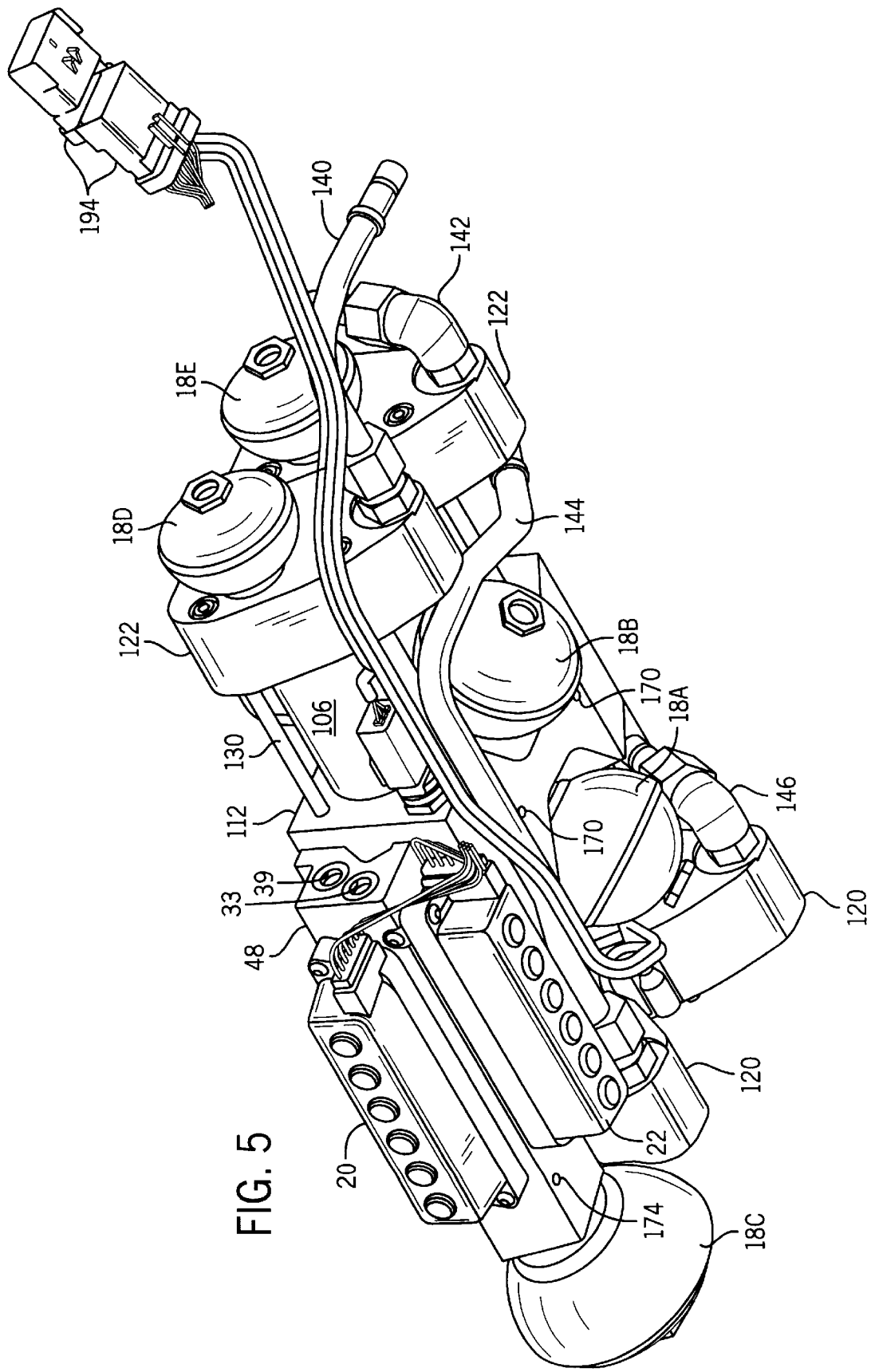
FIG. 5 is a bottom perspective view of the LDU alone like FIG. 4, but from the other side of the LDU.

Although the LDU 10 is described as being usable with the vehicle suspension system described in FIG. 5 of U.S. Pat. No. 5,601,307, it should be understood that it could be used with any hydraulic vehicle suspension system, not just the one illustrated and described.

The purpose of the reservoir 30 is to contain in reserve a supply of hydraulic fluid to be provided under pressure by the motor/pump 32 to the LDU 10 upon demand of supply valve bank 20 of the LDU 10, and to receive hydraulic fluid from the LDU 10 when the tank valve bank 22 of the LDU sends fluid to the reservoir. Pressure line 35 connects the pump outlet with the LDU inlet port 33 and return line 37 provides communication between the LDU tank port 39 and the inlet 41 of the reservoir 30. The motor pump 32 and the valves in the supply 20 and relief 22 valve banks are operated in response to signals from an electronic control unit (e.g., ECU 68 in FIG. 5 of U.S. Pat. No. 5,601,307) to supply hydraulic fluid to or remove hydraulic fluid from the various subcircuits of the vehicle suspension system including the reservoir, to maintain the vehicle level or to change the elevation of the vehicle relative to the wheels. The reservoir 30 is described in commonly owned U.S. patent application Ser. No. 09/280,044 filed Mar. 26, 1999, entitled "Hydraulic Fluid Reservoir", the disclosure of which is hereby incorporated by reference.

The plumbing of the LDU 10 differs from the plumbing disclosed in FIG. 5 of U.S. Pat. No. 5,601,307, in that the four wheel circuits are connected to the end chambers of the LDU cylinders 14, 16, rather than the inward chambers, and the inward chambers of each LDU cylinder 14, 16 are connected to the corresponding inward chambers of the other LDU cylinder 14, 16. Thus, in the LDU 10, the inner chambers are the bump chambers. Referring to FIGS. 8 and 9A–C, and particularly to FIG. 9C which illustrates cylinder 16 in longitudinal cross-section, end chambers 16A and 16B are separated from the adjacent respective inner chambers 16C and 16D by respective piston heads 102 and 104 of piston 105, the heads 102 and 104 having sliding seal rings 107 sealing against the inner surface of cylinder sleeves 106. The inner chambers 16C and 16D are separated from each other by a land 110 formed in the corresponding bore 111 of block 112, which mounts a sliding seal ring 109 that seals against the center, reduced diameter rod portion 114 of the piston 105, between the heads 102 and 104. Opposed end caps 120, 122, fix the cylinder sleeves 106 to the block 112, each with three equiangularly spaced bolts 130. End caps 120 mount linear transducer assemblies 141 which extend axially inwardly of the pistons 105 to sense the linear position of a magnet 143 which is carried by the piston 105. End caps 122 mount accumulators 18D and 18E for pressurizing the adjacent end chamber 16B or 14B, each of which would typically be connected to the upper chamber of one of the rear wheel support cylinders, as further explained below.

Figure 8:
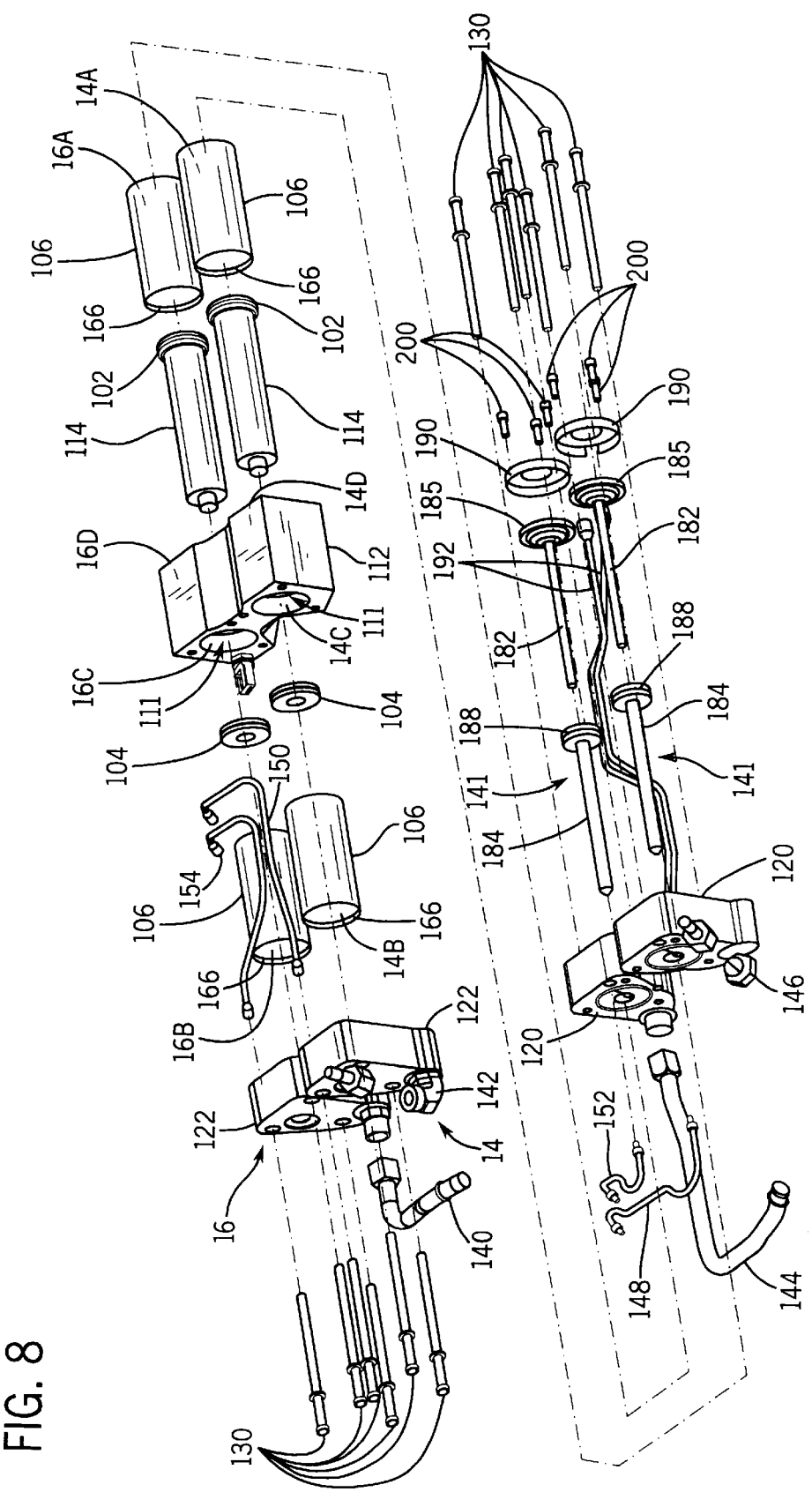
FIG. 8 is an exploded perspective view of the cylinder subassembly of the LDU.

Cylinder 14 is essentially identical to cylinder 16 as shown in FIG. 8, and shares block 112 in common with cylinder 16. End caps 120 and 122 are essentially the same, except for being mirror images of the end caps 120, 122 of the cylinder 16. Referring to FIG. 11, inner chamber 14C is in communication with inner chamber 16C via bore 132 and inner chamber 14D is in communication with inner chamber 16D via bore 134 formed in block 112. A pressure transducer 138 may also be provided in the block 112 for providing pressure signals indicative of the pressures in one or both of the sets 14C-16C, 14D-16D of inner chambers. Pressure transducers may also be provided in the end caps 120, 122.

Referring to FIG. 8, pipe 140 connected to cap 122 and in communication with chamber 16B provides a means to connect chamber 16B with the wheel cylinder circuit that connects, for example, the upper chamber of the left rear wheel support cylinder with the lower chamber of the right front wheel support cylinder. Pipe 142 provides a means to connect chamber 14B with the wheel cylinder circuit that connects, for example, the upper chamber of the right rear wheel support cylinder with the lower chamber of the left front wheel support cylinder. Pipe 144 provides a means to connect chamber 16A with the wheel cylinder circuit that connects, for example, the upper chamber of the left front wheel support cylinder with the lower chamber of the right rear wheel support cylinder. Pipe 146 provides a means to connect chamber 14A with the wheel cylinder circuit that connects, for example, the upper chamber of the right front wheel support cylinder with the lower chamber of the left rear wheel support cylinder. The invention is not limited to this particular plumbing arrangement, any suitable or desirable plumbing arrangement being possible.

Figure 18:
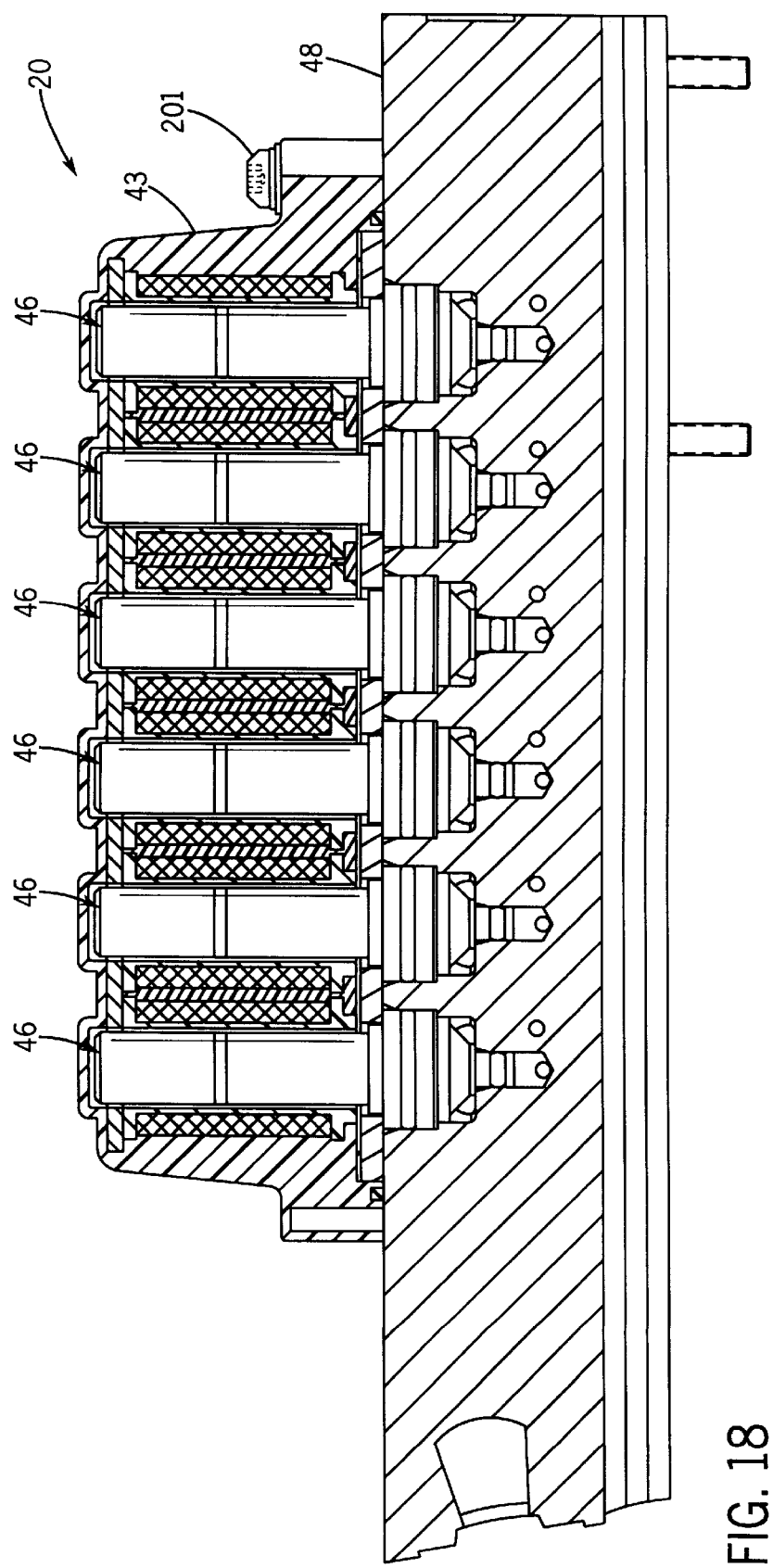
FIG. 18 is a sectional view from the plane of the line 18—18 of FIG. 17.
Figure 19:
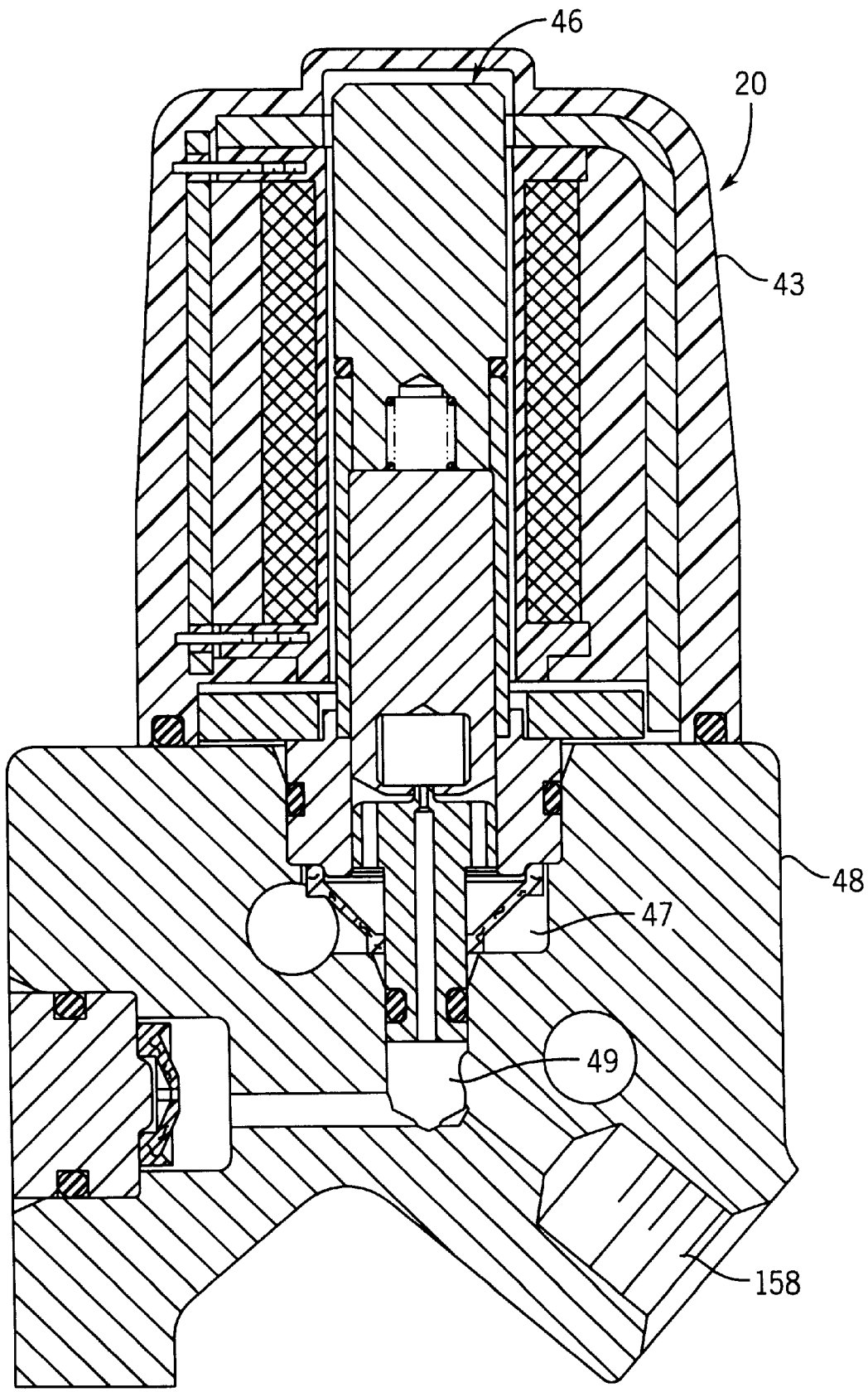
FIG. 19 is a sectional view from the plane of the line 19—19 of FIG. 17.

The inlet port 33 and outlet port 39 connecting the LDU 10 with the power unit 12 are formed in valve manifold 48, in which are mounted the twelve valves 46 of the pressure valve bank 20 and of the tank valve bank 22 (six valves in each bank). There is one pressure valve 46 and one connected tank valve 46 for each of the end chambers 14A, 14B, 16A, 16B, and for the inner chamber sets 14C-16C and 14D-14D. The inlet port 33 is connected by passageways within the manifold 48 to the high pressure sides 47 of the six supply valves 46, and their low pressure sides 49 communicate with the respective chamber 14A, 14B, 16A, 16B, or inner chamber set 14C-16C or 14D-14D. The outlet port 39 is connected by passageways within the manifold 48 to the low pressure sides of the six tank valves 46, and their high pressure sides communicate with the respective chamber 14A, 14B, 16A, 16B, or inner chamber set 14C-16C or 14D-14D. Only the pressure supply valve bank 20 is illustrated in FIGS. 18 and 19. The valves 46 and coil pack 43 are the same for the tank valve bank 22.

Figure 6:
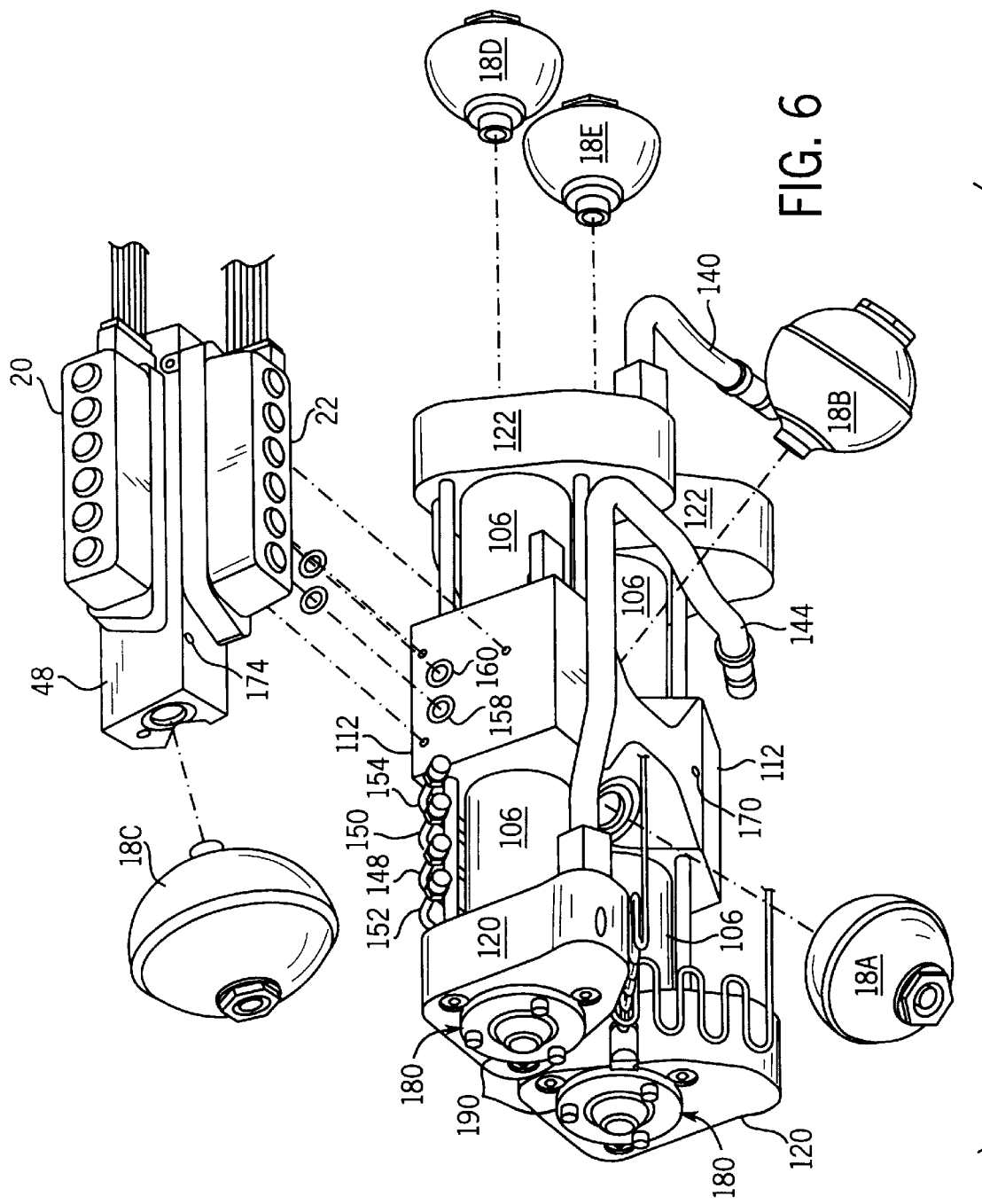
FIG. 6 is an exploded bottom perspective view of the LDU.
Figure 7:
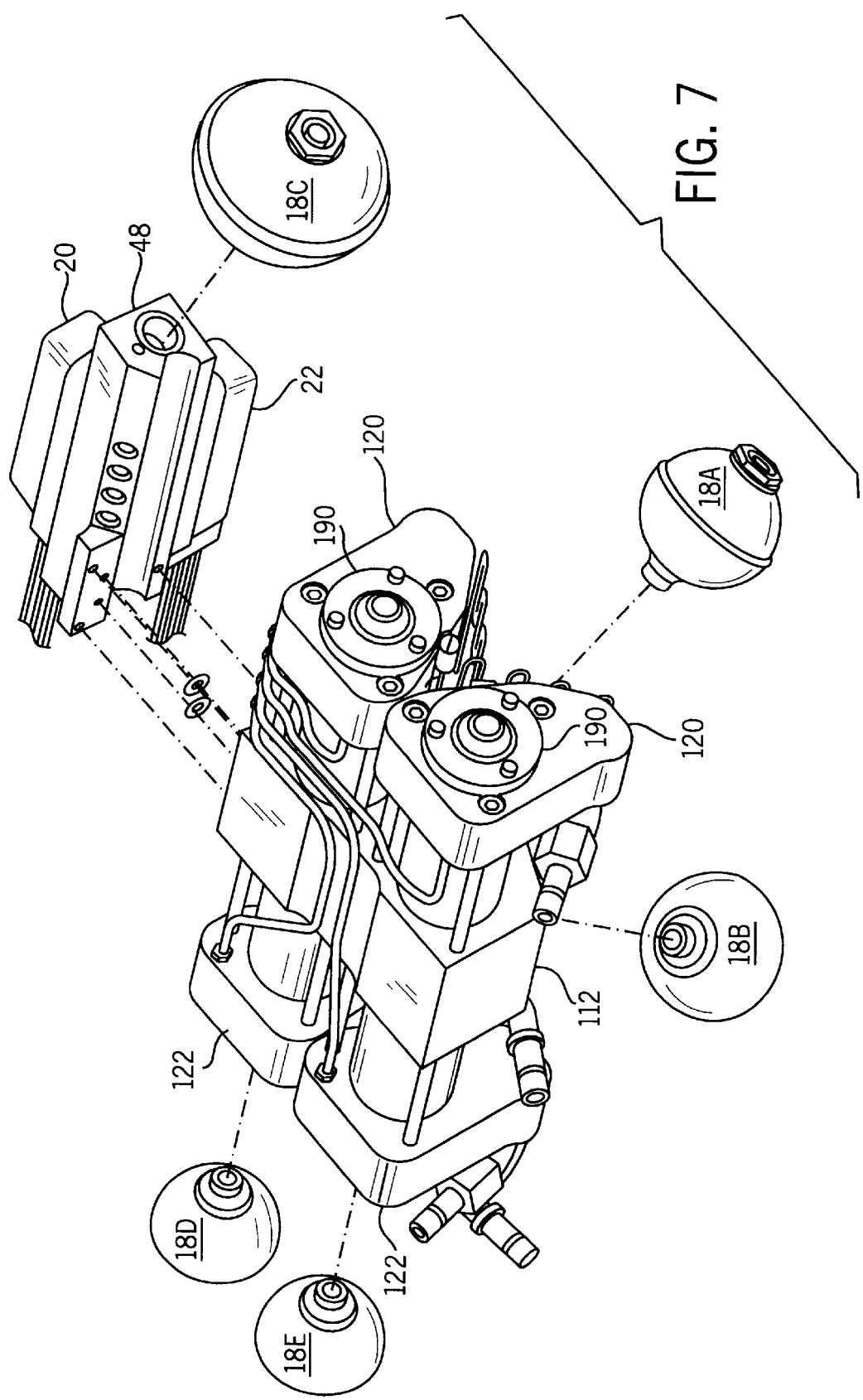
FIG. 7 is an exploded top perspective view of the LDU.

Appropriate passageways in the manifold 48 and conduits 148, 150, 152 and 154 connect the respective end chambers 14A, 14B, 14C and 14D with the low pressure side of a respective valve 46 of the supply bank 20 and with the high pressure side of a respective valve 46 of the bank 22 of tank valves 46. Referring to FIGS. 6 and 7, the manifold 48 is bolted to the block 112. Port 158 and passageways within the manifold 48 establish communication between chamber set 14C-16C and the low pressure side of the supply valve 46 that serves the chamber set 14C-16C and the high pressure side of the tank valve 46 that serves the chamber set 14C-16C. Port 160 and passageways within the manifold 48 establish communication between chamber set 14D-16D and the low pressure side of the supply valve 46 that serves the chamber set 14D-16D and the high pressure side of the tank valve 46 that serves the chamber set 14D-16D. The valve banks 20,22, including the valves 46, are fully described in commonly owned U.S. patent application Ser. No. 09/261,020, filed Mar. 2, 1999, entitled "Solenoid Valve Coil Pack", the disclosure of which is hereby incorporated by reference.

Referring to FIG. 5, a gas charged accumulator 18A pressurizes the set 14C-16C of connected inner chambers of the LDU cylinders 14, 16 and another gas charged accumulator 18B pressurizes the other set 14D-16D. The remaining larger accumulator 18C, mounted to the valve manifold 48 may be used as the pump charge accumulator 202 illustrated closest to the pump 65 in FIG. 5 of U.S. Pat. No. 5,601,307. The two smaller accumulators 18D and 18E at the rearward end of the LDU 10 may each be applied as the accumulator for one of the wheel cylinders of the suspension system; for example, one of the smaller accumulators 18D would be the accumulator for one of the rear wheel cylinders, and the other accumulator 18E would be the accumulator for the other rear wheel cylinder, as discussed above. This may be desirable, for example, if there is not room in the rear wheel wells to provide the accumulators at that location. For the front wheel cylinders, which typically would have adequate room in the wheel wells for the accumulators, an accumulator is attached to or provided as part of each respective cylinder, as described for example in U.S. patent application Ser. No. 09/261,065 filed Mar. 2, 1999 entitled "Ram With Electronics Enclosure Compartment", the disclosure of which is hereby incorporated by reference.

Referring to FIG. 8, piston head 102 is integral with rod 114, and head 104 is screwed or otherwise secured to rod 114. This is so that rod 114 can be inserted through seal 109 in the block 112 and, after insertion, head 104 can be fixed to it.

Referring to FIGS. 10–14, the cylinder sleeves 106 fit in the block 112 and the end caps 120, 122, and are secured thereby, so as to minimize friction in the movement of the pistons 105. Annular grooves 161 are formed in the opposite ends of the block 112, and similar annular grooves 162 are formed in the end caps 120, 122. The grooves 161, 162 receive the ends of the sleeves 106 with sufficient clearance so as to permit the sleeves 106 to float radially during assembly so that they can self-align, or "float" into a radial position that minimizes the radial forces exerted on the piston 105, thereby reducing friction in the movement of the piston 105. An o-ring seal 164 is received at the bottom inside corner of each groove 161, 162, and the inside circumferential surfaces 166 at both ends of each cylinder sleeve 106 are beveled so as to fit against the o-ring 164 and squeeze it into the inside corner of the grooves 161, 162.

The LDU is assembled with the axes of the cylinders 14, 16 vertical, so as to minimize the effects of gravity, which otherwise causes the parts to lean to the downward side. If fixed in that position, excess friction results. Accordingly, with the longitudinal axes of the cylinders 14, 16 in a vertical position, after the piston rods 114 are inserted through the respective bores 111 in the block 112 and the piston heads 104 are attached, the cylinder sleeves 106 are attached to the block 112 with three bolts 130 each extending through the corresponding end cap 120, 122 and each threaded into and tightened to the block 112. This is preferably performed with the block 112 supported with the cylinder axes of the bores 111 vertical. Thereby, the parts are self aligning to result in the minimum amount of friction possible for a given set of parts.

Figure 2:
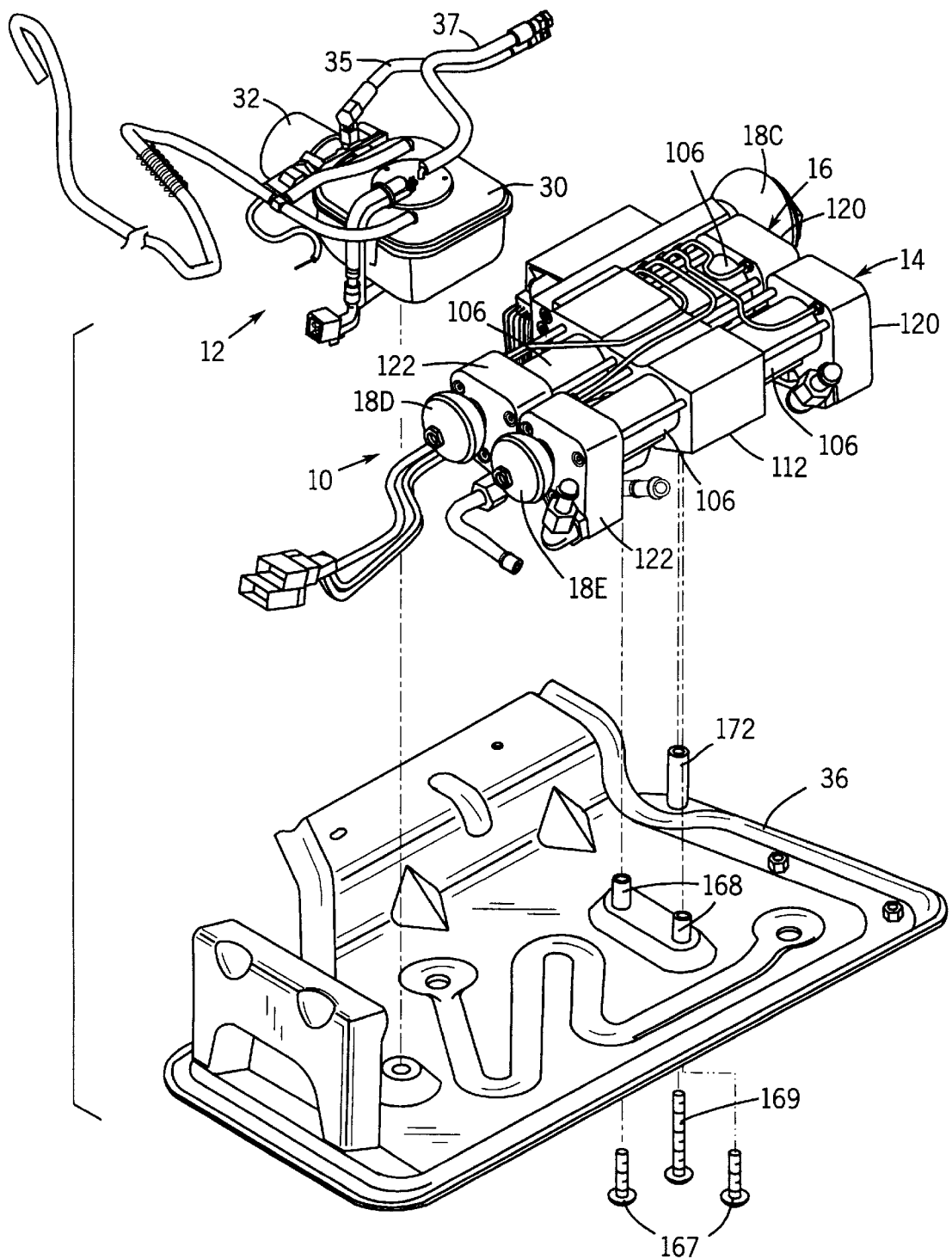
FIG. 2 is an exploded perspective view of the components of FIG. 1.
Figure 3:
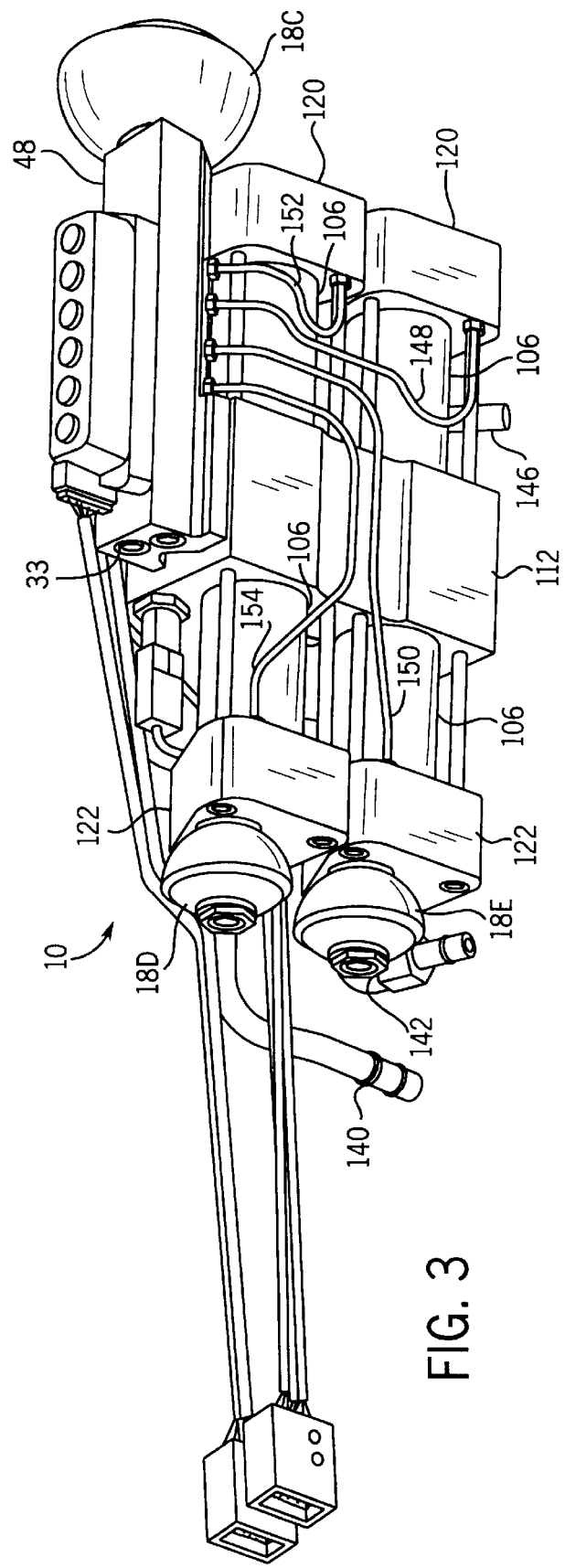
FIG. 3 is a top perspective view of the LDU alone.
Figure 4:
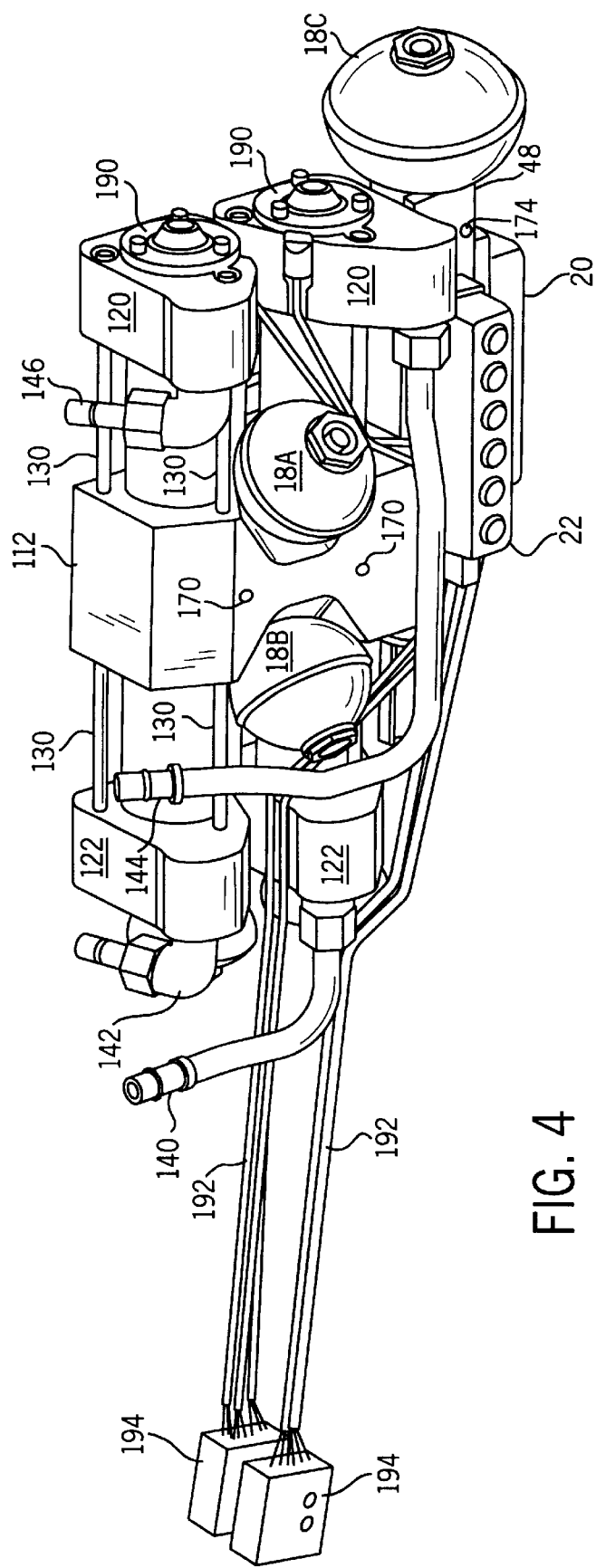
FIG. 4 is a bottom perspective view of the LDU alone.

Another friction minimizing feature of the LDU 10 is that the cylinder sleeves 106 and their attached end caps 120, 122 are cantilevered from the block 112. The block 112 is mounted to the skid plate 35 by two bolts 167 extending though two tubular posts 168 (FIG. 2) and the bolts are threaded into two holes 170 (FIGS. 4 and 5) in the bottom of the block 112. A third bolt 169 extends through tubular post 172 and is threaded into hole 174 (FIGS. 4 and 5) of manifold 48. Thus, the LDU 10 is mounted by a three point mounting, with the block 112 providing the main support with two of the points, and a third point spaced as far as possible from the line intersecting the two holes 170 for support against tipping about that line. This mounting does not exert forces on the cylinder sleeves 106, which would tend to misalign them with the pistons 105 and increase friction.

Figure 9C:
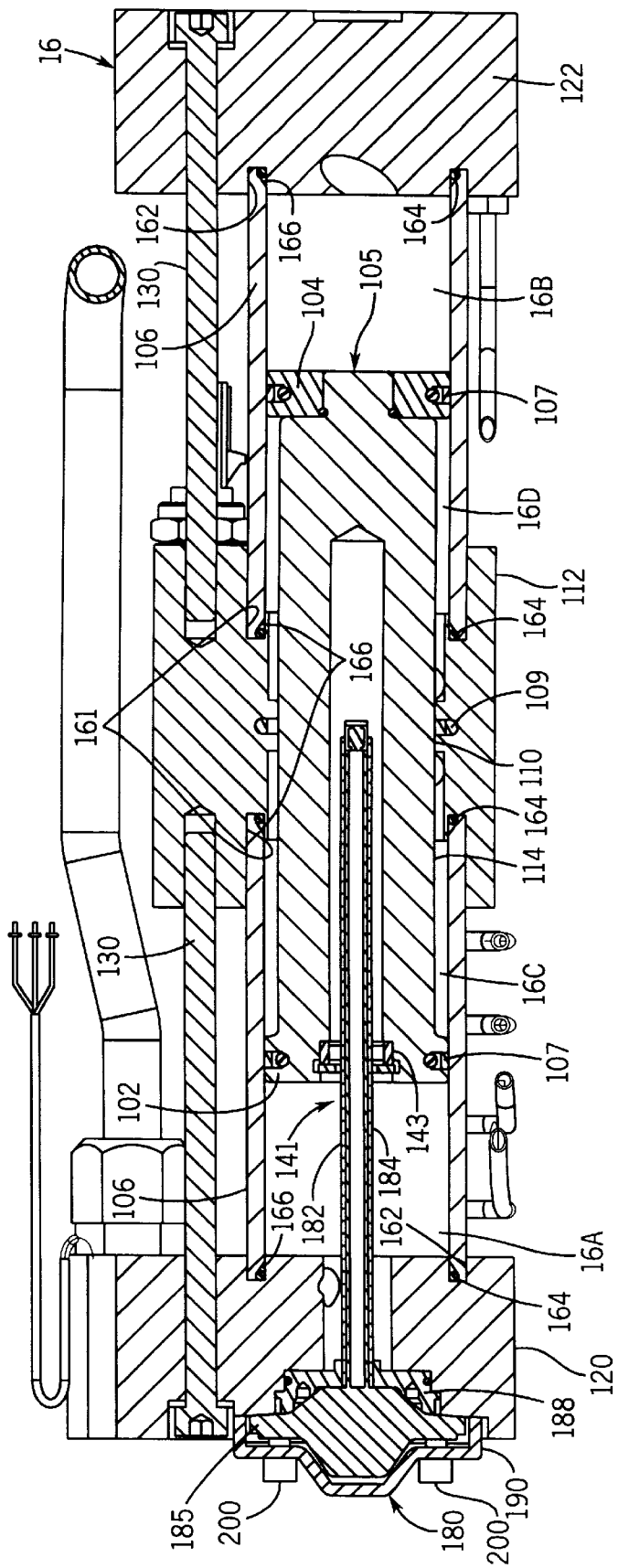
FIG. 9C is a section view from the plane of the line 9C—9C of FIG. 9B.

The end caps 120 each mount a linear position transducer assembly 141 which includes a clam shell compartment 180 and a sensor 182, very similar to the linear position transducer assembly disclosed in commonly owned U.S. patent application Ser. No. filed Mar. 2, 1999, entitled "Ram With Electronics Enclosure Compartment", referred to above. The clam shell compartment 180 includes a pressure tube 184 which is sealed at its distal end by a pressure tube cap 186 and is sealed at its proximal end to a clam shell body 188. The position sensor 182 extends inside the tube 184, which extends into the piston rod 114, which is tubular as shown in FIG. 9C, and the tube 184 keeps the sensor 182 dry. As mentioned above, a magnet 142 is affixed inside each piston 105 so that the associated sensor 182 can sense the axial position of the magnet 142. Sensor 182 may be any type of linear displacement transducer, such as a magneto-strictive type of sensor.

Each sensor 182 is supported inside its associated clam shell compartment 180 by flange 185 of sensor 182, which contains circuitry of the sensor 182. Such a sensor is commercially available from Leopold Kostal GMBH & Co. The flange 185 is captured between body 188 and clam shell cover 190. The cover 190 has a side opening to accommodate wires 192 for the sensor 182, which are connected to a plug 194. The plug 194 is also connected to the valve bank coils and to the pressure transducer 138. The clam shell body 188 is sealed by o-ring 196 to the end cap bore 198 in which the clam shell compartment 180 is mounted. Bolts 200 extend through the caps 190 and bodies 188 and are threaded into holes in the end caps 120 to secure the clam shell compartment 180 and the sensor 182 contained therein to the LDU 10. With this assembly, the sensor 182 can be removed from the LDU, for example for repair or replacement, without draining the suspension system of hydraulic fluid, or opening it up.

A preferred embodiment of a load distribution unit for a hydraulic vehicle suspension system has been described in detail. Modifications and variations of the preferred embodiment will be apparent to those skilled in the art. Therefore, the invention should not be limited to the embodiment described, but should be defined by the claims which follow.

We claim:

1. In a load distribution unit for a vehicle suspension system having at least two cylinders with a piston in each cylinder dividing said cylinder into four variable volume chambers, the improvement wherein:

each said cylinder includes:
a block having a bore therethrough;
a pair of cylinder sleeves coaxial with said bore in said block, each said sleeve extending from an opposite side of said block;
a pair of end caps, one of said end caps for each said sleeve, each said end cap for said associated sleeve sealing against an end of said associated sleeve opposite from said block; and
fasteners fixing said end caps so as to compress said cylinder sleeves between said end caps and said block.

2. The improvement of claim 1, wherein said load distribution unit is mounted to a vehicle by at least two fasteners secured to said block and by at least a third fastener secured to a valve manifold which is secured to said block.

3. The improvement of claim 1, wherein an end cap of each cylinder has a clam shell compartment mounted to it, said clam shell compartment having a body which is sealed to said end cap and a cover which is removeable from said body without breaking the seal of said body to said end cap.

4. The improvement of claim 3, wherein a pressure tube extends from said body into and coaxially with said cylinder.

5. The improvement of claim 4, wherein said pressure tube extends into a bore formed in said piston.

6. The improvement of claim 1, wherein said cylinder sleeves are received in said block and said end caps with clearances permitting said cylinder sleeves to float radially upon assembly of said cylinder sleeves to said block and end caps.

7. A method of assembling a load distribution unit as claimed in claim 1, wherein said method includes the step of orienting said bore in said block in a vertical position when attaching said end caps to said block with said fasteners.

8. The improvement of claim 1, wherein said block is common to said two cylinders, said block having formed in it two bores, one of said bores for each said cylinder.

\* \* \* \* \*

UNITED STATES PATENT AND TRADEMARK OFFICE
CERTIFICATE OF CORRECTION

PATENT NO. : 6,213,485 B1
DATED : April 10, 2001
INVENTOR(S) : Robert A. Doll et al.

Page 1 of 1

It is certified that error appears in the above-identified patent and that said Letters Patent is hereby corrected as shown below:

Column 1,
Line 25, change "comers" to -- corners --;

Column 6,
Lines 31 and 34, change "comers" to -- corners --;

Column 7,
Line 3, after "Ser. No.", insert -- 09/261,065 --.

Signed and Sealed this

Twelfth Day of March, 2002

Attest:

Attesting Officer

JAMES E. ROGAN
Director of the United States Patent and Trademark Office